(12) United States Patent
Tudhope

(10) Patent No.: US 7,651,616 B2
(45) Date of Patent: Jan. 26, 2010

(54) APPARATUS AND METHOD FOR ISOLATING AND/OR ELIMINATING AT LEAST ONE SOLUTE FROM A SOLUTION

(76) Inventor: Bryan R. Tudhope, Unite 3 Loneridge, 207 Swartgoud Street, Ridgeway (ZA) 2091

( * ) Notice: Subject to any disclaimer, the term of this patent is extended or adjusted under 35 U.S.C. 154(b) by 638 days.

(21) Appl. No.: 11/284,909

(22) Filed: Nov. 23, 2005

(65) Prior Publication Data

US 2006/0073248 A1 Apr. 6, 2006

Related U.S. Application Data

(63) Continuation of application No. 10/257,676, filed as application No. PCT/IB01/00383 on Mar. 15, 2001, now abandoned.

(30) Foreign Application Priority Data

Apr. 14, 2000 (ZA) .................................. 00/1900

(51) Int. Cl.
*B01D 61/00* (2006.01)
*B01D 63/00* (2006.01)
*B01D 15/00* (2006.01)
*C12H 1/04* (2006.01)

(52) U.S. Cl. .................... 210/652; 210/651; 210/257.2; 210/660; 210/656; 210/690; 426/330.4; 426/330.5; 426/271; 426/494; 426/592

(58) Field of Classification Search ................ 210/652, 210/651, 195.2, 660, 656, 690; 426/11, 52, 426/271, 592, 490, 330.4, 239, 424
See application file for complete search history.

(56) References Cited

U.S. PATENT DOCUMENTS

| | | | | |
|---|---|---|---|---|
| 4,320,009 | A * | 3/1982 | Hilton et al. | 210/651 |
| 4,806,244 | A | 2/1989 | Guilhem | |
| 5,094,867 | A * | 3/1992 | Detering et al. | 426/271 |
| 5,104,665 | A * | 4/1992 | Fleet et al. | 426/15 |
| 5,480,665 | A | 1/1996 | Smith | |
| 6,001,406 | A * | 12/1999 | Katzke et al. | 426/422 |
| 6,472,009 | B1 * | 10/2002 | Berrebi et al. | 426/424 |
| 6,913,776 | B2 * | 7/2005 | Ferrarini | 426/330.4 |
| 6,936,173 | B2 * | 8/2005 | DeFrees | 210/653 |
| 7,022,366 | B2 * | 4/2006 | Ferrarini | 426/592 |
| 7,455,777 | B2 * | 11/2008 | Allan | 210/652 |

FOREIGN PATENT DOCUMENTS

WO 9323151 11/1993

* cited by examiner

*Primary Examiner*—Ana M Fortuna
(74) *Attorney, Agent, or Firm*—Novak, Druce + Quigg, LLP

(57) ABSTRACT

This invention relates to an apparatus for removing solutes from a solution using nano-filtration means to provide a treated wine.

20 Claims, 1 Drawing Sheet

US 7,651,616 B2

APPARATUS AND METHOD FOR ISOLATING AND/OR ELIMINATING AT LEAST ONE SOLUTE FROM A SOLUTION

This application is continuation of U.S. patent application Ser. No. 10/257,676, filed on Oct. 15, 2002 now abandoned, which is incorporated herein by reference in its entirety and is a §371 National Stage Application of International Application No. PCT/IB01/00383, filed on 15 Mar. 2001, claiming the priority of South African Patent Application No. 2000/1900 filed on 14 Apr. 2000.

FIELD OF THE INVENTION

This invention relates to the isolation and/or elimination of solutes from a solution, more particularly from beverages.

BACKGROUND TO THE INVENTION

It is well-known in the art that during the course of the production of certain beverages, compounds are produced which detract from the flavour and quality of the beverage. This is a particular problem associated with the production of alcoholic beverages where compounds such as ethyl acetate, acetic acid, and acetaldehyde are detrimental to the flavour and aroma of the alcoholic beverage.

It is also known in the art that such undesirable compounds may be removed from solution by means of reverse osmosis. This process of reverse osmosis requires elevated pressures to achieve its effect, resulting in an increase in temperature. It is commonly known that certain volatile components in solution are adversely affected by an increase in temperature that leads to associated unfavourable development of derivatives of integral solutes in solution, or even more unfavourably the generation of contaminating compounds in solution. Reverse osmosis also only removes up to 15% of the volatile acidity from the wine in a single pass. If higher levels are to be removed using the reverse osmosis process, the wine has to then be passed 2-3 times which can lead to a further deterioration in the whole quality of the wine as well as excessive increases in temperature. To limit, insofar as possible, the effects of the reverse osmosis on the quality of the treated solution heat exchangers are utilised, which is costly and cumbersome.

Ultra-filtration is also known to remove unwanted compounds from a solution. However, this requires low pressure with concomitant detrimental effects to the solution insofar as desirable compounds also pass through into the permeate.

OBJECT OF THE INVENTION

It is an object of the invention to provide an apparatus, which, at least partially, alleviates the above-mentioned problems.

It is a further object of the invention to provide a method, which, at least partially, alleviates some of the above-mentioned problems.

SUMMARY OF THE INVENTION

In accordance with the invention there is provided an apparatus for removing at least one solute from a solution comprising a receptacle for a solution; a nano-filtration means in fluid communication with the receptacle; a means for driving the solution through the nano-filtration means to produce a retentate at a retentate outlet and a raw permeate at a raw permeate outlet; a separation means having an inlet which is in fluid communication with the raw permeate outlet of the nano-filtration means and a treated permeate effluent outlet which is in fluid communication with the retentate outlet which, in use, combines the retentate egressing from the retentate outlet with the treated permeate egressing from the treated permeate effluent outlet to provide a treated solution.

In accordance with this embodiment of the invention the separation means is preferably a treatment column, the column being an ion exchange column, alternatively a hydrophobic interaction column, further alternatively an affinity column, still further alternatively a gel filtration or gel exclusion column.

In accordance with a further embodiment of the invention there is an apparatus for removing at least one solute from an untreated alcoholic beverage comprising a receptacle for the untreated alcoholic beverage; a nano-filtration means in fluid communication with the receptacle; a means for driving the untreated alcoholic beverage through the nano-filtration unit to produce a retentate at a retentate outlet and a raw permeate at a raw permeate outlet; an anion exchange column having an inlet which is in fluid communication with the raw permeate outlet of the nano-filtration unit and a treated permeate effluent outlet which is in fluid communication with the retentate outlet which, in use, combines the retentate egressing from the retentate outlet with the treated permeate egressing from the treated permeate effluent outlet to provide a treated untreated alcoholic beverage.

Furthermore, in accordance with the invention there is provided a method for treatment of a solution to remove at least one solute from a solution, including the steps of subjecting the solution to a process of nano-filtration for producing a retentate and a raw permeate, with the raw permeate containing the solute; treating the raw permeate for removing at least a portion of the solute to provide a treated permeate; and combining the retentate and the treated permeate to provide a treated solution, preferably the treatment of the raw permeate occurs under high pH conditions on an anion exchange column.

BRIEF DESCRIPTION OF THE DRAWINGS

One embodiment of the invention is described below, by way of example only, with reference to the accompanying drawing where.

DETAILED DESCRIPTION WITH REFERENCE TO THE DRAWINGS

Figure 1:
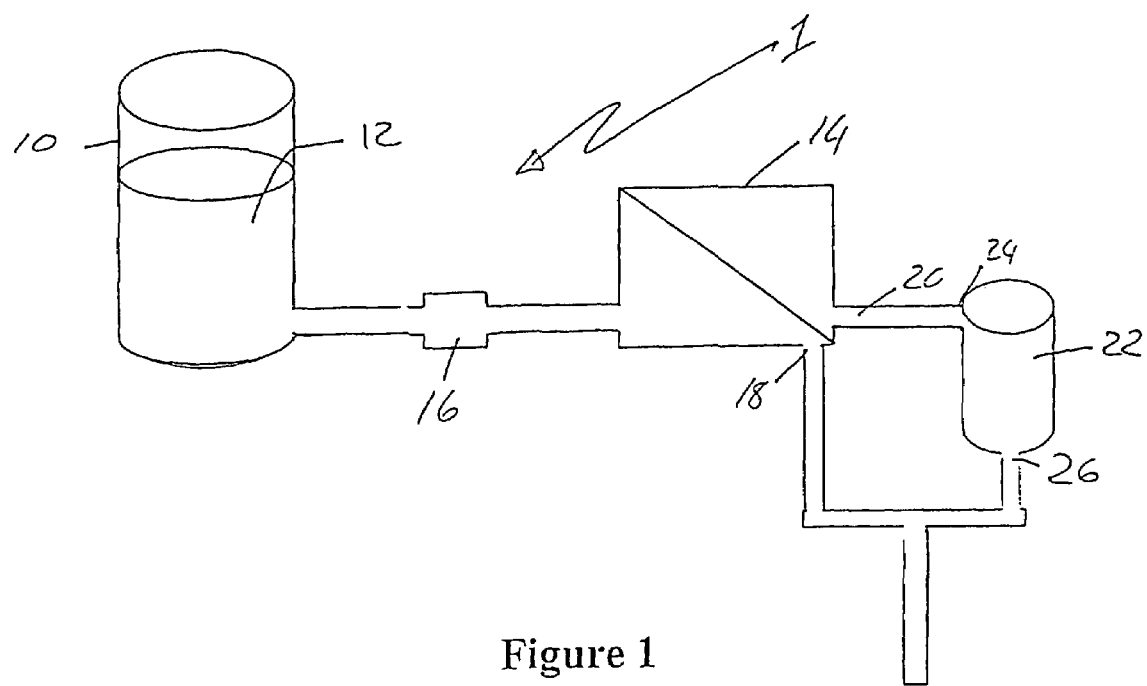
FIG. 1 is a schematic view of apparatus for isolating and/or eliminating a solute from a solution.

With reference to the drawing an apparatus (1) for removing a compound (not shown) of interest from an untreated alcoholic beverage (12) is illustrated. The apparatus (1) has a receptacle (10) which receives the untreated alcoholic beverage (12), a nano-filtration unit (14) which is in fluid communication with the receptacle (10) and a pump (16) to drive the untreated alcoholic beverage (12) through the nano-filtration unit (14) to produce a retentate (not shown) at a retentate outlet (18) and a raw permeate (not shown) at a raw permeate outlet (20) and a anion exchange column (22) having an inlet (24) which is in fluid communication with the raw permeate outlet (20) of the nano-filtration unit (14) and a treated permeate effluent outlet (26) which is in fluid communication with the retentate outlet (18) which, when the apparatus (1) is in use, combines the retentate (not shown) egressing from the retentate outlet (18) with the treated permeate (not shown) egressing from the treated permeate effluent outlet (26) to provide a treated alcoholic beverage (not shown).

One embodiment of the method for treatment of an untreated alcoholic beverage (12) to remove at least one compound (not shown) from the untreated alcoholic beverage (12) includes the steps of subjecting the untreated alcoholic beverage (12) to a process of nano-filtration through the nanofiltration unit (14) to produce a retentate (not shown) and a raw permeate (not shown), with the raw permeate (not shown) containing the compound to be removed from the raw permeate (not shown) followed by treating the raw permeate (not shown) by passage through an anion exchange column under high pH conditions (22) thereby removing at least a portion of the compound (not shown) to provide a treated permeate (not shown); and combining the retentate (not shown) and the treated permeate (not shown) to provide a treated alcoholic beverage.

It will be appreciated that numerous variations, which will be apparent to those skilled in the art, can be made to the above-mentioned embodiment of the invention without departing from the scope thereof. In particular the means for driving the untreated solution through the nano-filtration unit may be gravity-based.

The invention claimed is:

1. An apparatus for removing at least one solute selected from the group consisting of ethyl acetate and acetic acid from an untreated wine alcoholic beverage comprising:
   a receptacle containing the untreated wine alcoholic beverage;
   a nano-filtration unit in fluid communication with the receptacle;
   a pump for driving the untreated wine alcoholic beverage through the nano-filtration unit to produce a retentate at a retentate outlet and a raw permeate at a raw permeate outlet, wherein the raw permeate contains an increased concentration of the at least one solute selected from the group consisting of ethyl acetate and acetic acid;
   a treatment column selected from at least one member of the group consisting of an ion exchange column, a hydrophobic interaction column, an affinity column, a gel filtration-column, and a gel exclusion column for absorbing at least a portion of the at least one solute from the raw permeate, the treatment column having an inlet in fluid communication with the raw permeate outlet of the nano-filtration unit and a treated permeate effluent outlet in fluid communication with the retentate outlet for combining the retentate egressing from the retentate outlet with the treated permeate egressing from the treated permeate effluent outlet to provide a treated wine as an alcoholic beverage, the apparatus for single pass nanofiltration.

2. The apparatus of claim 1, wherein the treatment column is the ion exchange column.

3. The apparatus of claim 2, wherein the ion exchange column is an anion exchange column.

4. The apparatus of claim 1, wherein the treatment column is the hydrophobic interaction column.

5. The apparatus of claim 1, wherein the treatment column is the affinity column.

6. The apparatus of claim 1, wherein the treatment column is the gel filtration-column or gel exclusion column.

7. The apparatus of claim 1, wherein the treatment of the raw permeate occurs under high pH conditions in the ion exchange column.

8. A method for treatment of wine to remove at least one solute selected from the group consisting of ethyl acetate and acetic acid from wine, including the steps of:
   subjecting the wine to a process of nano-filtration for producing a retentate and a raw permeate, with the raw permeate containing an increased concentration of the at least one of said solute;
   treating the raw permeate in a treatment column selected from at least one member of the group consisting of an ion exchange column, a hydrophobic interaction column, an affinity column, a gel filtration-column, and a gel exclusion column for removing at least a portion of the at least one of said solute to provide a treated permeate; and
   combining the retentate and the treated permeate to provide a treated wine as an alcoholic beverage in a single nanofiltration step.

9. The method of claim 8, wherein the treatment of the raw permeate occurs high pH conditions in the ion exchange column.

10. The method of claim 8, wherein the treating comprises passing the raw permeate through the ion exchange column.

11. The method of claim 8, wherein the treating comprises passing the raw permeate through the hydrophobic interaction column.

12. The method of claim 8, wherein the treating comprises passing the raw permeate through the affinity column.

13. The method of claim 8, wherein the treating comprises passing the raw permeate through the gel filtration-column or gel exclusion column.

14. The method of claim 8, wherein the treating comprises passing the raw permeate through the ion exchange column, and the ion exchange column is an anion exchange column.

15. An apparatus for removing at least one solute selected from the group consisting of ethyl acetate and acetic acid from an untreated wine alcoholic beverage comprising:
   a receptacle containing the untreated wine alcoholic beverage;
   a nano-filtration unit in fluid communication with the receptacle;
   wherein the nano-filtration unit is located for gravity based driving of the untreated wine alcoholic beverage through the nano-filtration unit to produce a retentate at a retentate outlet and a raw permeate at a raw permeate outlet, wherein the raw permeate contains an increased concentration of the at least one solute selected from the group consisting of ethyl acetate and acetic acid;
   a treatment column selected from at least one member of the group consisting of an ion exchange column, a hydrophobic interaction column, an affinity column, a gel filtration-column, and a gel exclusion column for absorbing at least a portion of the at least one solute from the raw permeate, the treatment column having an inlet in fluid communication with the raw permeate outlet of the nano-filtration unit and a treated permeate effluent outlet in fluid communication with the retentate outlet for combining the retentate egressing from the retentate outlet with the treated permeate egressing from the treated permeate effluent outlet to provide a treated wine as an alcoholic beverage, the apparatus arranged for single pass nanofiltration.

16. The apparatus of claim 15, wherein the treatment column is the ion exchange column.

17. The apparatus of claim 16, wherein the ion exchange column is an anion exchange column.

18. The apparatus of claim 15, wherein the treatment column is the hydrophobic interaction column.

19. The apparatus of claim 15, wherein the treatment column is the affinity column.

20. The apparatus of claim 15, wherein the treatment column is the gel filtration-column or gel exclusion column.

* * * * *

UNITED STATES PATENT AND TRADEMARK OFFICE
CERTIFICATE OF CORRECTION

PATENT NO.         : 7,651,616 B2
APPLICATION NO.    : 11/284909
DATED              : January 26, 2010
INVENTOR(S)        : Bryan R. Tudhope It is certified that error appears in the above-identified patent and that said Letters Patent is hereby corrected as shown below:

Column 3, line 18, cancel the text beginning with "1. An apparatus for" to and ending "nanofiltration." in column 3, line 44, and insert the following claim:

--1. An apparatus for removing at least one solute selected from the group consisting of ethyl acetate and acetic acid from an untreated wine alcoholic beverage comprising:
    a receptacle containing the untreated wine alcoholic beverage;
    a nano-filtration unit in fluid communication with the receptacle;
    a pump for driving the untreated wine alcoholic beverage through the nano-filtration unit to produce a retentate at a retentate outlet and a raw permeate at a raw permeate outlet, wherein the raw permeate contains an increased concentration of the at least one solute selected from the group consisting of ethyl acetate and acetic acid;
    a treatment column selected from at least one member of the group consisting of an ion exchange column, a hydrophobic interaction column, an affinity column, a gel filtration-column, and a gel exclusion column for adsorbing at least a portion of the at least one solute from the raw permeate, the treatment column having an inlet in fluid communication with the raw permeate outlet of the nano-filtration unit and a treated permeate effluent outlet in fluid communication with the retentate outlet for combining the retentate egressing from the retentate outlet with the treated permeate egressing from the treated permeate effluent outlet to provide a treated wine as an alcoholic beverage, the apparatus for single pass nanofiltration.

Column 4, line 25, cancel the text beginning with "15. An apparatus for" to and ending "single pass nanofiltration." in column 4, line 52, and insert the following claim:

--15. An apparatus for removing at least one solute selected from the group consisting of ethyl acetate and acetic acid from an untreated wine alcoholic beverage comprising:
    a receptacle containing the untreated wine alcoholic beverage;
    a nano-filtration unit in fluid communication with the receptacle;

Signed and Sealed this
Seventeenth Day of May, 2011

David J. Kappos
*Director of the United States Patent and Trademark Office* wherein the nano-filtration unit is located for gravity based driving of the untreated wine alcoholic beverage through the nano-filtration unit to produce a retentate at a retentate outlet and a raw permeate at a raw permeate outlet, wherein the raw permeate contains an increased concentration of the at least one solute selected from the group consisting of ethyl acetate and acetic acid;

a treatment column selected from at least one member of the group consisting of an ion exchange column, a hydrophobic interaction column, an affinity column, a gel filtration-column, and a gel exclusion column for adsorbing at least a portion of the at least one solute from the raw permeate, the treatment column having an inlet in fluid communication with the raw permeate outlet of the nano-filtration unit and a treated permeate effluent outlet in fluid communication with the retentate outlet for combining the retentate egressing from the retentate outlet with the treated permeate egressing from the treated permeate effluent outlet to provide a treated wine as an alcoholic beverage, the apparatus arranged for single pass nanofiltration.--

(12) EX PARTE REEXAMINATION CERTIFICATE (8888th)
United States Patent
Tudhope

(10) Number: US 7,651,616 C1
(45) Certificate Issued: Mar. 6, 2012

(54) APPARATUS AND METHOD FOR INSOLATING AND/OR ELIMINATING AT LEAST ONE SOLUTE FROM A SOLUTION

(76) Inventor: Bryan R. Tudhope, Ridgeway (ZA)

Reexamination Request:
No. 90/009,946, Sep. 26, 2011

Reexamination Certificate for:
Patent No.: 7,651,616
Issued: Jan. 26, 2010
Appl. No.: 11/284,909
Filed: Nov. 23, 2005

Certificate of Correction issued May 17, 2011.

Related U.S. Application Data

(63) Continuation of application No. 10/257,676, filed as application No. PCT/IB01/00383 on Mar. 15, 2001, now abandoned.

(30) Foreign Application Priority Data

Apr. 14, 2000 (ZA) .............................. 00/1900

(51) Int. Cl.
*B01D 15/00* (2006.01)
*B01D 61/00* (2006.01)
*B01D 63/00* (2006.01)
*C12H 1/04* (2006.01)

(52) U.S. Cl. ..................... 210/652; 210/257.2; 210/651; 210/656; 210/660; 210/690; 426/271; 426/330.4; 426/330.5; 426/494

(58) Field of Classification Search .................. None
See application file for complete search history.

(56) References Cited

To view the complete listing of prior art documents cited during the proceeding for Reexamination Control Number 90/009,946, please refer to the USPTO's public Patent Application Information Retrieval (PAIR) system under the Display References tab.

*Primary Examiner* — Stephen Stein

(57) ABSTRACT

This invention relates to an apparatus for removing solutes from a solution using nano-filtration means to provide a treated wine.

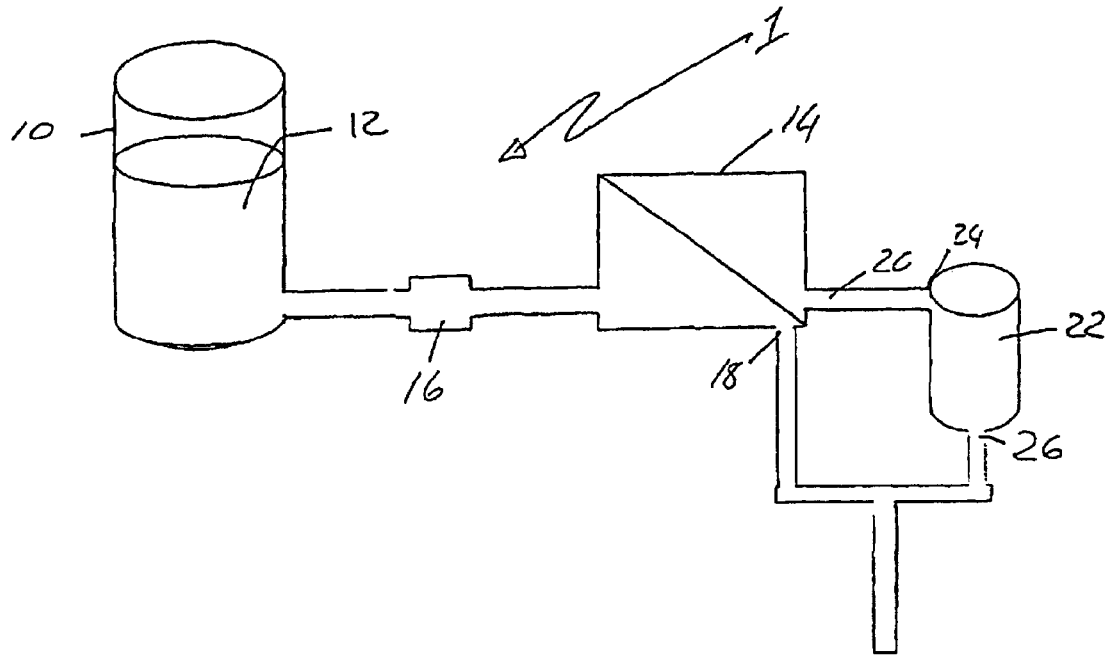

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-3, 7-10 and 14-17 is confirmed.

Claims 4-6, 11-13 and 18-20 were not reexamined.

* * * * *